United States Patent Office 3,472,523
Patented Oct. 14, 1969

3,472,523
STATIC SEAL
John H. Rentschler and Robert W. Carlson, Jr., Edina, Minn., assignors to Minnesota Rubber Company, Minneapolis, Minn., a corporation of Minnesota
Filed Sept. 20, 1967, Ser. No. 669,174
Int. Cl. F16j 15/48, 15/02
U.S. Cl. 277—209                                12 Claims

ABSTRACT OF THE DISCLOSURE

Disclosed herein is a static sealing ring made of a resilient flowable material throughout and characterized by its cross-sectional configuration which in its free form is uniform and generally rectangular and has substantially right-angled corners and a pair of opposed straight sides and a pair of opposed sealing sides, each of which carries a plurality of convexly shaped arcuate sealing lobes exceeding two in number, one each of which is disposed adjacent one of the corners and the remaining lobes being disposed therebetween and at least one thereof extending outwardly beyond said corner adjacent lobes.

---

Figure 1:
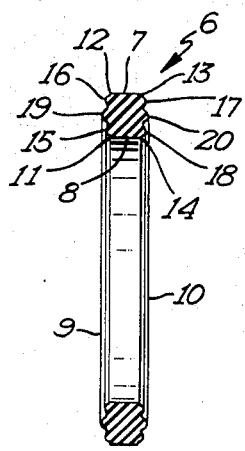

It is a general object of our invention to provide a novel and improved sealing ring which will perfect a static seal more effectively between a pair of surfaces within one of which is disposed an annular sealing groove in juxtaposition to the opposite surface so that the sealing ring may bear thereagainst.

It is a more specific object of our invention to provide a novel and improved static sealing ring made of a resilient flowable material throughout and having a novel and uniform cross-sectional configuration which enables it to perfect a more efficient seal when installed within a groove under compression, especially at high pressures.

Another object is to provide a novel and improved static sealing ring which will provide zero leakage at low pressures and greatly reduce leakage at high pressures so as to reduce the leakage over an extended period to approximately 50–70 percent of that provided by similar sealing devices heretofore known.

Figure 2:
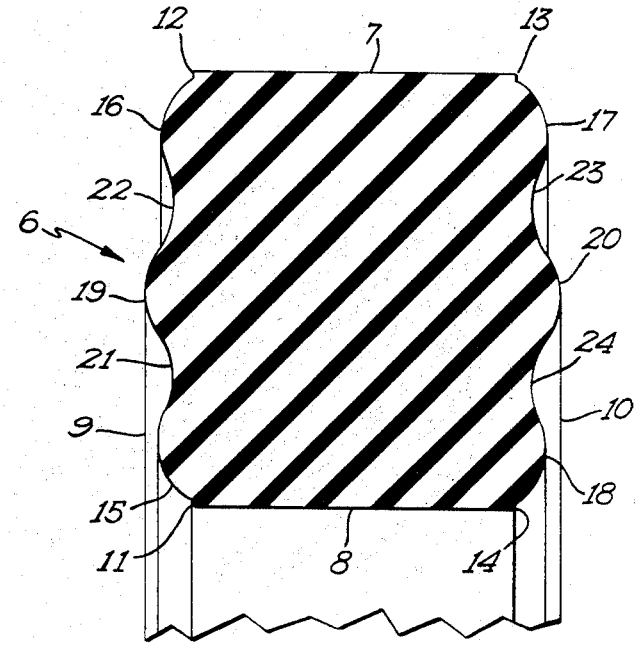
Figure 3:
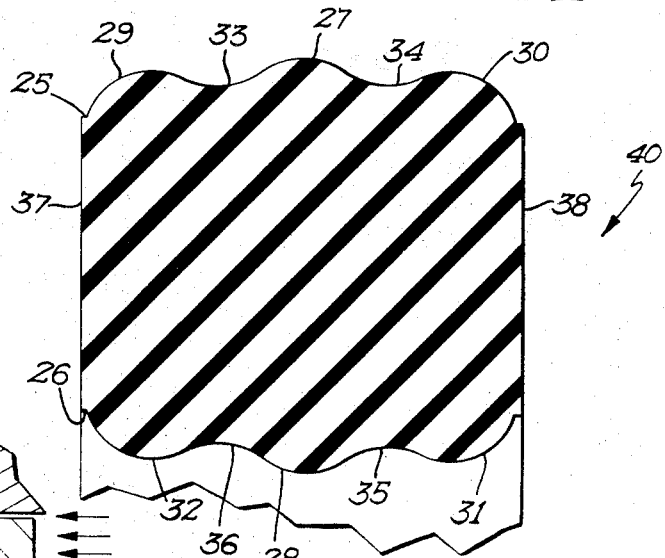
Figure 4:
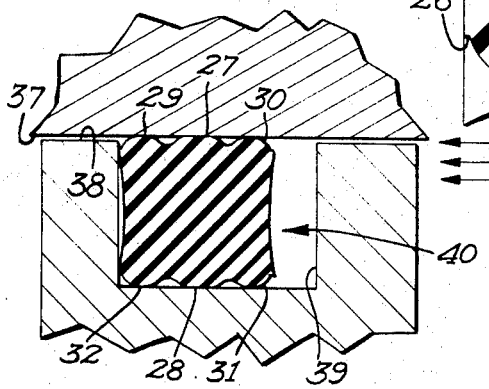

These and other objects and advantages of our invention will more fully apear from the following description, made in connection with the accompanying drawings, wherein like reference characters refer to the same or similar parts throughout the several views, and in which:

FIGURE 1 is a vertical sectional view of one embodiment of our invention in its free form, FIGURE 2 is a fragmentary vertical section on an enlarged scale of the sealing ring shown in FIGURE 1 and having the corner and sealing lobes carried by the axially spaced side, FIGURE 3 is a fragmentary vertical sectional view of a second embodiment of our invention wherein the sealing lobes are carried by the radially spaced side, and FIGURE 4 is a fragmentary vertical sectional view showing the embodiment of FIGURE 3 on a smaller scale disposed within a sealing groove with the pressure being applied thereagainst in a given direction.

One embodiment of our invention, as disclosed in FIGURES 1–2 is comprised of a sealing ring identified generally by the numeral 6 having a pair of opposed radially spaced sides 7 and 8 which are straight or flat and a pair of opposed axially spaced sides 9 and 10. This ring 6 has substantially rectangular corners as at 11, 12, 13 and 14.

Adjacent each corner on the axially spaced sides 9 and 10 is an arcuately shaped smoothly contoured convex lobe such as 15, 16, 17 and 18. Disposed intermediately between these corner adjacent lobes 15–18 and carried by each of the sides 9 and 10 is an arcuately shaped smoothly contoured convex sealing lobe. This sealing lobe on side 9 has been identified by the numeral 19 and the one on side 10 has been identified by the numeral 20. Each of the side surfaces 9 and 10 is concavely shaped in the areas between the corner adjacent lobes and the sealing lobe as shown at the numerals 21, 22 and 23, 24.

Each sealing lobe 19 and 20 is characterized by the fact that it protrudes outwardly axially beyond its adjacent corner adjacent lobes. Each of these lobes extends outwardly a distance beyond the outer confines of the corner adjacent lobes 15–18 a distance less than 10 percent of the outer confines of said ring taken through the corner adjacent lobes adjacent each of said sides. Thus sealing lobe 19 extends outwardly beyond the lobes 15 and 16 a distance less than 10 percent of the distance between the outer confines of the lobes 15 and 18.

The radius of convexity of each of said sealing lobes 19, 20 is equal to the radius of the concavities immediately adjacent thereto and to the radius of convexity of its adjacent corner adjacent lobes. Thus the radius of convexity of the sealing lobe 19 is equal to the radius of the concavities 21 and 22. The radius of convexity of each of said sealing lobes 19 and 20 is also equal to 18 percent of the dimensions of the outer confines of the ring, taken through opposite lobes adjacent one of said straight surfaces. Thus the radius of convexity of the lobe 19 is equal to 18 percent of the distance from the outer surface of lobe 15 to the outer surface of lobe 18.

The dimension of the sealing ring of FIGURES 1–2 between the opposed straight surfaces 7 and 8 is 1.15 times the dimensions of the outer confines of the ring taken through opposite lobes adjacent one of said straight surfaces such as 16 and 17. Thus the distance between sides 7 and 8 is 1.15 times the distance between the outer confines of lobes 16 and 17.

The extent of volumetric protrusion of the sealing lobes 19 and 20 beyond the outer confines of the remainder of the ring (as measured by the distance from the outer surface of corner adjacent lobe 16 to the outer surface of corner adjacent lobe 17) is substantially less than the combined volumetric concavities adjacent said lobe. Thus, the lobe 20 has a volumetric protrusion outwardly beyond the lobes 17 and 18 which is substantially less than the combined volumetric concavities 23 and 24 adjacent said lobe 20.

The embodiment shown in FIGURE 3 is similar to that shown in FIGURE 2 with the exception that the lobes are carried by the radially spaced sides 25 and 26 instead of by the axially spaced sides 9 and 10 of FIGURE 2. The intermediately disposed sealing lobes 27 and 28 bear the same relationships to the corner adjacent lobes 29, 30, 31 and 32 and to the concavities 33, 34, 35 and 36 as described above with respect to the corresponding features in FIGURE 2. Likewise, the various dimensions bear the same relationships, the only difference being that with respect to the embodiment shown in FIGURE 2, the lobes are carried on the axially spaced sides whereas in the embodiment shown in FIGURE 3, the various lobes are carried on the radially spaced sides and the axially spaced sides 37 and 38 are flat instead of bearing lobes.

FIGURE 4 shows a pair of surfaces 37 and 38 in juxtaposition and having a sealing groove 39 formed in the surface 37, the depth of the groove being slightly less than the radial dimensions of the sealing ring 40. As shown, the depth of the groove is such as to compress slightly the sealing lobes 27 and 28 and also the corner adjacent lobes 29, 30, 31 and 32. Pressure is shown as being applied from the right-hand side as viewed in FIGURE 4 and the general shape of the sealing ring 40 as compressed and in pressure applied state is illustrated therein. It will be noted that the greater mass of material carried in the sealing lobes 27 and 28 is compressed and forced inwardly and outwardly into the corner adjacent lobes 29, 30, 31 and 32 to perfect a more efficient seal which provides essentially zero leakage at low pressures and greatly reduced leakage at high pressures, the leakage in the latter instance being only approximately 50–70 percent of the leakage experienced with sealing rings heretofore known.

It will be noted that the characteristic feature of this sealing ring is the presence of the outwardly extending intermediate sealing lobe which extends beyond the outer confines of the ring and beyond the adjacent corner adjacent lobes so that upon compression the flowable material is urged outwardly from the central portion of the ring into the corner adjacent lobes to thereby cause the sealing ring to better conform to the walls of the sealing groove 39 and perfect the improved seal.

What is claimed is:

1. A static sealing device comprising a continuously formed ring made of a resilient flowable material throughout and adapted to be fitted into a sealing groove of ring-like configuration:
   (a) said ring being generally rectangular and uniform in cross-sectional configuration throughout and including a set of two opposed generally radially extending surfaces and a set of two opposed generally axially extending surfaces,
   (b) each of the four corners defined between the adjacent surfaces being substantially right-angled in configuration,
   (c) each surface of one of said sets of two opposed surfaces being substantially straight,
   (d) each surface of the other of said sets of two opposed surfaces having a plurality of spaced arcuate convexly shaped lobes thereon exceeding two in number and separated from each other by concavities disposed therebetween, and
   (e) one of each of said lobes being disposed adjacent one each of said corners adjacent the surface bearing said lobes and at least one of the other of said lobes being disposed intermediately between said corner adjacent lobes and extending outwardly from its supporting surface beyond the confines of its said adjacent lobes.

2. The structure defined in claim 1 wherein the radius of curvature of said lobes approximates 18 percent of the dimensions of the outer confines of said ring taken through opposite lobes adjacent one of said straight surfaces.

3. The structure defined in claim 1 wherein the dimensions of said ring between said opposed straight surfaces approximates 1.15 multiplied by the dimensions of the outer confines of said ring taken through opposite lobes adjacent one of said straight surfaces.

4. The structure defined in claim 1 wherein the radius of curvature of said lobes equals the radius of curvature of the concavities therebetween.

5. The structure defined in claim 1 wherein said intermediately disposed lobe extends outwardly beyond its adjacent lobes adjacent said corners a distance less than 10 percent of the outer confines of said ring taken through said corner adjacent lobes.

6. The structure defined in claim 1 wherein said lobes total three in number and extend across substantially the entire dimensions of their said supporting surfaces.

7. The structure defined in claim 1 wherein the extent of volumetric protrusion of said intermediately disposed lobe beyond the outer confines of the remainder of said ring is less than the combined volumetric concavities adjacent to said lobe.

8. The structure defined in claim 1 wherein the extent of volumetric protrusion of said intermediately disposed lobe beyond the outer confines of the remainder of said ring is substantially less than the combined volumetric concavities adjacent to said lobe.

9. The structure defined in claim 1 wherein said lobes are carried by said radially extending surfaces.

10. The structure defined in claim 1 wherein said lobes are carried by said axially extending surfaces.

11. A sealing device comprising a continuously formed ring made of a resilient flowable material throughout and adapted to fit into a sealing groove of ring-like configuration formed in one of a pair of opposed surfaces:
   (a) said ring in its free form being uniform and generally rectangular in cross-sectional configuration and including a set of two opposed generally radially extending surfaces and a set of two opposed generally axially extending surfaces connected between adjacent portions of said radially extending surfaces,
   (b) each surface of one of said sets of opposed surfaces having a plurality of spaced arcuate convexly shaped lobes thereon exceeding two in number and separated from each other by recesses disposed therebetween,
   (c) each of said lobes having a smoothly contoured exterior surface,
   (d) one of each of said lobes being disposed adjacent one each of the four corners defined between the adjacent surfaces of said ring, and
   (e) at least one of the other of said lobes being disposed intermediately between said corner adjacent lobes and extending outwardly from its supporting suprface beyond the confines of its said adjacent lobes.

12. The structure defined in claim 11 wherein said recesses are concave in shape and merge tangentially with the arcuate convex exterior surfaces of said lobes.

References Cited
UNITED STATES PATENTS

| | | |
|---|---|---|
| 2,841,429 | 7/1958 | McCuistion. |
| 2,873,132 | 2/1959 | Tanner. |
| 2,983,533 | 5/1961 | Tisch _____ 277—209 |
| 3,052,478 | 9/1962 | Horvereid _____ 277—209 |

LAVERNE D. GEIGER, Primary Examiner

JEFFREY S. MEDNICK, Assistant Examiner

U.S. Cl. X.R.

277—206